March 2, 1937.  E. L. MAYO  2,072,763
MEANS FOR HEATING AUTOMOTIVE VEHICLE INTERIORS
Filed March 6, 1935
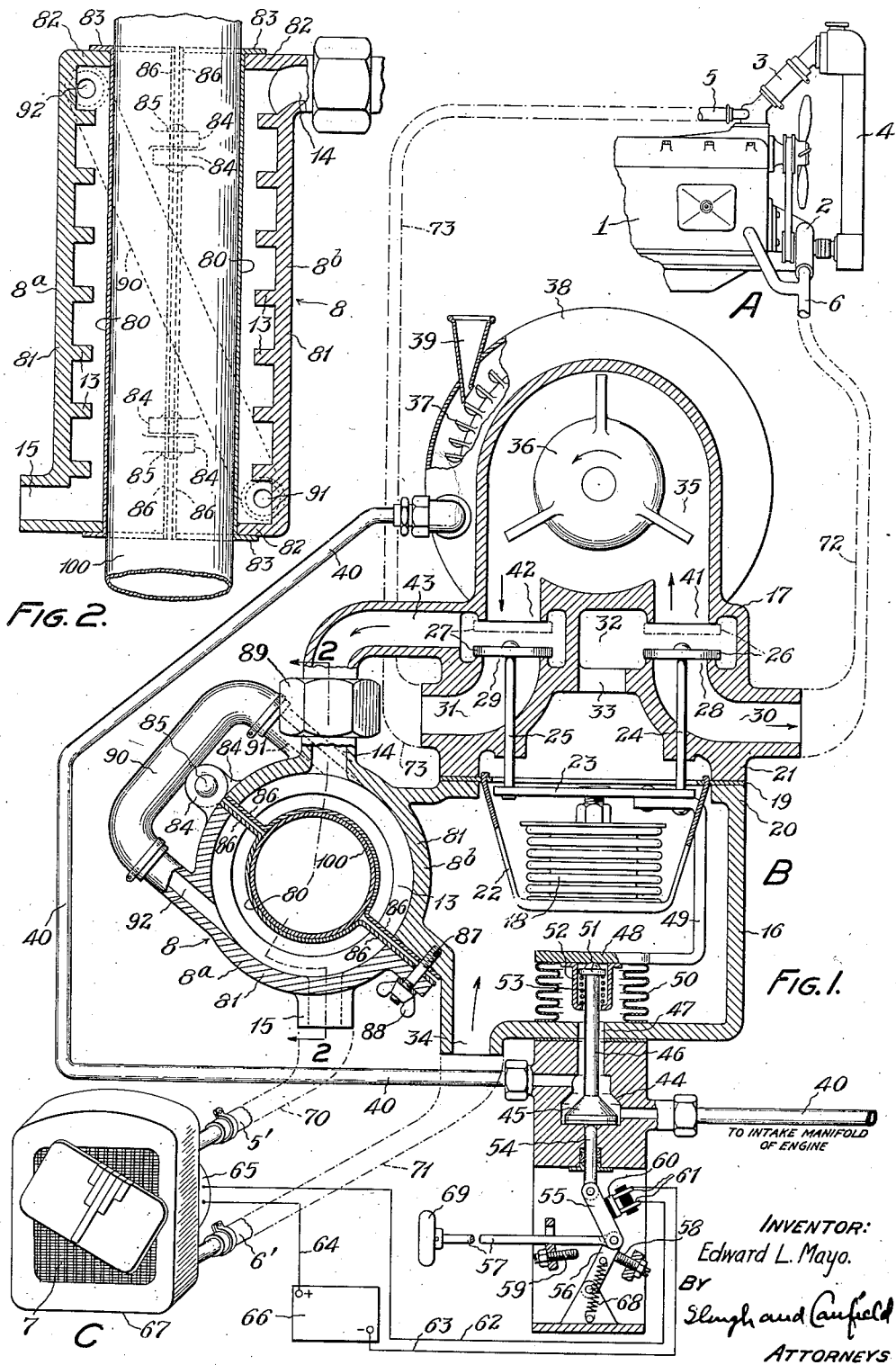

Patented Mar. 2, 1937

2,072,763

UNITED STATES PATENT OFFICE 2,072,763

MEANS FOR HEATING AUTOMOTIVE VEHICLE INTERIORS

Edward L. Mayo, Cleveland, Ohio, assignor to The Bishop & Babcock Mfg. Company, Cleveland, Ohio, a corporation of Ohio Application March 6, 1935, Serial No. 9,613

17 Claims. (Cl. 237—12.3)

My invention relates to heating systems for motor vehicles and has a more particular application to the heating of the passenger compartment of automobiles, though not limited thereto.

Prior to my invention the interiors of automobiles have commonly been heated either by communication of heated air first passed over the outer walls of the exhaust manifold or exhaust pipe of the internal combustion engine of the vehicle, or more recently the more approved systems involve the provision of a heat exchanging unit having air passages interspersed through a heat radiating core included in a water conducting system with a fan or similar air impeller forcing air through said passages, the water in said system being heated generally by virtue of its being withdrawn from the water cooling system of the internal combustion engine.

Such latter systems are commonly called hot water heating systems in automotive parlance, but are subect to the objection that because of the great volume of water contained in the cooling system of an automobile the engine must be operated for a quite considerable period before the water reaches a temperature sufficient to properly heat the air passed through the heat radiating core of the hot water system.

Consequently, for sometime after the vehicle is in operation starting of the fan merely blows a blast of cold air into the interior of the vehicle. On the contrary the hot air system is less subject to objection on this account because the exhaust manifold of the vehicle speedily achieves a temperature which substantially heats the air passing thereover, and which being thence conducted into the interior of the vehicle promptly increases the temperature of the air in the passenger compartment.

However, the hot air heating system is objectionable for other reasons needless to be set forth here, and it is therefore an object of the present invention to achieve prompt heating of the air in the passenger compartment of an automotive vehicle, when the engine is operated, by virtue of the passage of heated water passed through a radiator core of the type commonly previously used in hot water heating systems.

Efforts directed somewhat along this line have recently been made involving the generation of steam by heat derived from the exhaust manifold or an exhaust pipe of the internal combustion engine, but such systems have not met with any substantial commercial success, first because of the difficulty in limiting the pressure of the steam which when excessive has sometimes exploded and destroyed the radiator core of the heater, besides projecting steam into the passenger compartment, suddenly and without previous warning.

Also, in steam heated systems where attempts have been made to avoid damage because of the generation of dangerously high steam pressures relief valves have had to be provided which in turn, by venting steam, require the installation of complicated apparatus which is not always positive in operation, to replenish the supply of water from the water cooling system of the engine; and in any case the water in the cooling system is constantly being depleted giving rise to over-heating of the engine and so-called "steaming" of the water in the cooling system with occasional additional large loss of water through the lost steam and water carried with it through the venting pipe of the automobile radiator.

It is therefore the purpose and principal object of the present invention to provide a so-called "hot water" heating system for the passenger compartments of automotive vehicles which will not be subject to the objections previously had in connection with any of the aforesaid heating systems.

Another object of my invention is to provide a separate limited supply of hot water for heating the radiator core of car heaters, a smaller amount of water being separately heated by a portion of the exhaust system of the internal combustion engine of the car promptly upon initiation of operation of the engine and without the generation of steam in the heating system or loss of liquid therefrom.

Another object of my invention is to provide an improved hot water heating system for automotive vehicles of the type previously set forth wherein upon a predetermined degree of temperature being achieved in the water of the heating system, the water in such system will be supplemented by additional flows of water from the water cooling system of the internal combustion engine.

Another object of my invention involves the further improvement of supplying all of the water for heating the core of the heater radiator from the water cooling system of the automobile, at the same time achieving prompt heating of the vehicle passenger compartment.

Another object of my invention therefore is to provide an improved water heating system for automotive vehicles.

Another object of my invention is to provide a so-called "instantaneously" heating auxiliary supply of hot water in a heating system otherwise of the conventional type.

Another object of my invention is to provide improved controlling apparatus for a system of the hot water type, wherein the foregoing objects are achieved.

Another object of my invention is to provide improved apparatus for effecting more prompt heating of the interior of an automotive vehicle, by virtue of the operation of an improved hot water heating system.

Another object of my invention is to provide an improved method for heating the interiors of automotive vehicles.

The foregoing and other objects of the invention and the invention itself will be more readily understood by reference to the following description of an embodiment of my invention wherein reference is made to the accompanying drawing supplementing said description, wherein:

Fig. 1 is a view, partly diagrammatic, illustrating a heating system and apparatus embodying my invention; the view including at A a fragmentary side elevational view of an automotive vehicle engine and a part of the circulating cooling system thereof; and at B a longitudinal sectional view of a thermostatically controlled pump device which I may employ for circulating liquid, the view showing also a fragment of the exhaust pipe of the engine and a stove type liquid heater associated therewith; and at C a perspective view of a vehicle interior heating radiator of the type comprising a liquid circulating core and a motor driven air blower;

Fig. 2 is a longitudinal sectional view of the stove type liquid heater of Fig. 1, the view being taken approximately along the planes 2—2 of Fig. 1.

In the drawing, the apparatus of Fig. 1 is illustrated in separate units at A, B and C. In practice these units are connected in a system by interconnecting conduits to avoid complications in the drawing, the conduit interconnections having been indicated at reduced scale by dash-dot-dash lines.

Referring, in the drawing, first to the usual parts of the usual hot water circulatory system for hot water heaters, the engine is shown at 1, Fig. 1 at A, having the usual water cooling jacket, water being circulated into said jacket from a pump conventionally indicated at 2 and discharged from said jacket through a conduit 3 to the automobile radiator 4 from whence the water cooled by the radiator is returned to the intake side of the pump 2 as is well understood. At 5 and 6 are shown nipple connections for portions of the heater system conduits, which commonly are constructed of rubber hose or the like, and which in prior hot water heater systems would directly lead to the radiator core of the hot water heater 7, Fig. 1 at C, nipple 6 commonly being connected at 6' to the heater and nipple 5 commonly being connected at 5' to the heater C of such system.

In Fig. 2 is illustrated and in Fig. 1 is indicated generally at 8 an exhaust heater preferably made in two parts 8a and 8b, each part being in the form of a tube, semi-circular in cross-section and closed at opposite ends. This construction is provided by an outer semi-cylindrical wall 81 and an inner semi-cylindrical wall 80 coaxial therewith, the opposite axial ends of the two walls being joined by overlapping end wall portions 82 and 83 thereof and longitudinally joined by radial planar portions 86—86 of the inner wall 80 engaging corresponding longitudinal portions of the outer wall.

Two like semi-cylindrical tubes thus formed are hingingly connected together by lugs 84—84 provided in adjacent pairs on the two outer walls 81—81 and having hinge pintles 85 extending therethrough. At the opposite side of the heater from the hinge, a stud 87 threaded into one outer wall 81 has a wing nut 87 engaging a lug 88 on the other outer wall 81. By this means the two semi-cylindrical tubular closed end tubes may be clamped around a portion of the engine exhaust pipe 100 with intimate heat-transferring contact thereof with the inner wall 80.

The two semi-cylindrical tubes are joined by a flexible hose or like flexible connector 90 connected at its opposite ends to nipples 91 and 92 communicating with the heater interiorly at opposite ends of the two semi-cylindrical tubes thereof. And the tubes respectively at the ends thereof opposite the nipples 91 and 92 have inlet and outlet nipples 14 and 15.

In the construction of heater illustrated, one of the halves, 86, has its wall 81 integral with and forming part of the casing wall of a thermostat casing 16, to be described.

By this construction, water flowing into the heater at the nipple 14 in the circulating system to be described, will flow longitudinally through one semi-cylindrical tube of the heater, and by way of nipple 91, flexible connection 90, nipple 92 to the other semi-cylindrical tube and longitudinally through it and out at the nipple 15, extracting heat from the exhaust pipe 100 and being heated thereby. To render the heater thus described more efficient, baffles 13 may be provided on the outer wall 81 extending inwardly therefrom to force the flowing water to flow between the radially inner ends of said baffles and the inner wall 80 in a relatively thin film to more effectively heat the water passing through the heater. By providing the heater in two parts hinged together, the heater may be installed upon and around a portion of the exhaust line from the engine at a suitable point therealong, and when installed will entirely encircle the exhaust line to efficiently extract heat therefrom, which intimate heat extracting relation would be substantially impossible in a heater construction which could be telescoped over the exhaust line and over the bends, flanges and the like commonly thereon. The exhaust line or pipe 100 of Fig. 1 at B will be understood to be a part of the exhaust pipe of the engine 1 illustrated in Fig. 1 at C and drawn to a greatly enlarged scale.

A housing is provided, preferably in two parts, comprising a thermostat casing 16 and a valve and pump casing 17 preferably secured together in any approved manner such as by bolting abutting flanges 20 and 21 thereof together, so as to form a unitary structure. A thermostat 18 is supported in the thermostat casing 16 by a frame comprising an outwardly radially extending annular flange 19 which may be conveniently clamped between the abutting flanges 20 and 21 of the housing, and comprising a depending stirrup 22 upon which is secured one end of the preferably bellows type thermostat 18, the upper and movable end of the bellows being connected to a transverse bar 23, to spaced points on which, at opposite sides of the axis of the bellows 18, are connected the lower ends of valve stems 24 and 25 extending vertically upwardly therefrom through the wall of the casing 17 and having on their upper ends valves 26 and 27.

When the bellows 18 is relatively cold, the valves 26 and 27 rest downwardly upon and close ports 28 and 29 communicating respectively with outlet and inlet nipples 30 and 31. The port 28 also communicates with a chamber 32 which communicates by a passageway 33 with the interior of the thermostat casing 16; and the thermostat casing has an inlet nipple 34.

Above the valves 26 and 27 a pump chamber 35 is provided having therein a vaned pump rotor 36 rotatable counterclockwise as viewed in Fig. 1 by an impeller jet type rotor 37 enclosed within an air-tight housing 38 and adapted to be rotatively driven by a jet of air entering the housing 38 through a jet nozzle 39 when partial vacuum is created in the housing 38 by engine vacuum communicated to the interior of the housing 38 through a pipe 40 in a manner to be described. The pump chamber 35 has inlet and outlet ports 41 and 42 disposed substantially opposite the ports 28 and 29 above described, and adapted to be closed by the valves 26 and 27 when in an elevated position thereof indicated in broken lines. When the valves are in their lower solid-line position, water may be pumped by the rotor 36 in at the inlet nipple 34, over and around the thermostat 18, through the passageway 33 into the chamber 32, through the pump inlet port 41, out at the pump outlet port 42, and out of the casing by an outlet nipple 43. The nipple 43 is connected by a coupling 89 to the intake nipple 14 of the heater.

In a manner to be described, the thermostat 18 may respond to a rise of temperature of the water thus being pumped and, may raise the valves 26 and 27, opening the ports 28—29 and on a further rise of temperature may close the ports 41 and 42.

The pipe 40 communicates with a source of engine vacuum through a valve comprising a valve seat 44 and a valve 45. The valve 45 is connected to a stem 46 extending upwardly through a perforation 47 in the thermostat casing 16 and loosely abuts at its upper end upon a head 48 which is connected by a bracket 49 to the bar 23 above described; the head 48 being sealed upon the inner wall of the casing 16 by a bellows type seal element 50, permitting vertical reciprocatory movement of the head 48. The stem 46 has a collar 51 thereon and the head 48 has a depending stirrup 52, and a spring 53 abuts at opposite ends upon the collar and stirrup.

A plunger 54 reciprocably mounted below the valve 45 is pivotally connected at its lower outer end to a toggle element 55 which is pivotally connected to a toggle element 56, the lower end of which is stationarily pivotally supported. An operating rod 57 is connected to an intermediate portion of the toggle. Stops 58 and 59 limit movement of the toggle elements. A switch contact 60 on the toggle element 56 is engageable with and disengageable from a pair of stationary electric contacts 61, and adapted correspondingly to make and break a circuit through wires 62 and 63 and 64 which connect, in series relation, the motor 65 which drives the fan or blower of the radiator 7, and a battery 66 which may be the usual vehicle battery.

The upper end of the plunger 54 may be moved to engage the valve 45 and move it to its closed position on the valve seat 44 and may transmit its thrust through the stem 46 to the head 48 and bracket 49 to elevate the bar 23 and open the valves 26 and 27. This may be done by operatively moving the rod 57 toward the left as viewed in the drawing to straighten out the toggles 55—56. Similarly, the rod 57 may be moved toward the right to "break" the toggle to close the electric circuit described and permit the valve 45 to be opened; and with the parts in this position, the thermostat 18 may operate to elevate the valves 26 and 27 and may at the same time raise and close the valve 45—44, continued upward movement of the head 48 after the valve 45 has engaged its seat 44 being permitted by compression of the spring 53 from a normal untensioned condition.

The toggle 55—56 may be retained in either of its operative positions against the stops 58 and 59 by a spring 68 in a well known manner.

The car heater 67, at C, previously referred to may be of the usual type having a water-heated radiator core 7 and having a large number of small air passages extending from front to rear therethrough, the core conveying by a plurality of small passageways a path for water received into the radiator through the conduit 5' and discharged therefrom through the conduit 6'. To the rear of the radiator is mounted in any suitable manner the fan referred to, operated by the motor 65 which may be of any convenient type, so disposed that when operated it will force air from rear to front through the air passages of the radiator and into the car interior, such air abstracting heat from the water-heated radiator core when passing therethrough.

The conduit lines indicated in dash-dot-dash lines will be described in connection with a description of the operation of the system above described which follows. It is assumed that the engine is cold, so that the water in its radiator 4 and its own water jacket is relatively cool and of too low a temperature to heat the vehicle interior through a radiator such as that at 7. The engine 1 upon being started will quickly raise the temperature of the exhaust pipe 100 conveying exhaust gases from the engine and this will in turn speedily heat the water in the heater at C.

The water surrounding the thermostat 18 is at this time, of course, cold, and the thermostat being in the contracted position, holds the valves 26 and 27 in their solid-line port-closed position illustrated in Fig. 1. If it be desired to heat the vehicle interior, the control rod 57 which may have an operating handle 69 convenient to an operator of the vehicle, may be moved toward the right to effect closing of the circuit to the fan motor 65 to start the same. The valve 45 is thereupon moved to open position by the thermally effected contracted condition of the bellows 18 acting through the bracket 49 and head 48, and engine vacuum is thereby applied through the pipe 40 and by way of the valve 45—44 to operate the pump rotor 36.

Under the conditions of the apparatus just described, there is established a closed local system filled with water including the pump chamber 35, outlet nipple 43, inlet nipple 14 of the heater, the heater itself, outlet nipple 15, a conduit 70, to the connection 5', the radiator 67, connection 6', a conduit 71, inlet nipple 34, over and around the thermostat 18, and by way of passageway 33 and chamber 32 back to the pump chamber.

The pump rotor 36 is driven as above described and causes the water in the closed system specified above in the direction above described. This water is quickly heated by the heater on the exhaust pipe 100 and gives up some of its heat to the radiator 7 to heat the car interior; and the remaining heat heats the thermostat 18.

When the temperature of this water has risen to a predetermined amount determined by the thermostat 18 and always substantially below the boiling or steam-generating temperature, the thermostat 18 responds raising the valves 26 and 27 to open the ports 28—29. Thereupon water which has arrived at the chamber 32 along the path above described now divides and part flows through the pump chamber described and part flows through port 28 and out of the outlet nipple 30, and by way of a conduit 72 into the engine circulating system at the nipple 6, through the same and out at the nipple 5 through a conduit 73 to the inlet nipple 31, and thence through the port 29 where it unites with water discharged by the pump rotor 36 and flows through outlet nipple 43 thence to and through the heater and the radiator and back to the chamber 32, mixed with water in the above described local system.

The operation of the thermostat 18 to raise the valves 26 and 27 only occurs after the relatively small amount of water in the local system referred to has been heated to the desired temperature whereat the radiator 7 will properly heat the air passed through it by the motor-driven fan.

Furthermore, the thermostat 18 will only move the valves 26 and 27 from their valve seats sufficiently to permit just enough of the cooler water from the engine circulating system to mix with the water in the local system to keep this local system watered at the temperature at which the thermostat 18 responds. If too much cool water is merged with the local system, the thermostat 18 will be cooled thereby and will contract and reduce the amount, and vice versa. Thus the water in the radiator 7 is kept at substantially a constant temperature predetermined by the thermo-response of the thermostat 18, which temperature is predeterminedly maintained safely below boiling point.

As the engine itself warms up more and more and raises the temperature of its own circulating system, the water supplied therefrom to the local system is less able to keep the temperature of the water in the local system at the predetermined value; the thermostat 18 thus expands more and more and finally moves the valves to the broken-line position, closing the ports 41 and 42, under which conditions the pump rotor 36 may be stopped for lack of circulation therethrough.

From this time on, circulation will be from the engine cooling system, through the heater and radiator and back to the engine cooling system; the circulation being effected by the pump 2 of the engine.

If, due to any cause such for example as stopping of the engine for a period of time, the water should cool down somewhat causing the thermostat to partly close the valves, then when the engine is again started, the thermostat 18 may move the valves 26 and 27 to the necessary more open position to draw more of the water from the engine cooling system to maintain the water in the radiator 67 at the predetermined temperature; and subsequently, if the engine heats up sufficiently, to cause all of the radiator water to be drawn from the engine cooling system.

When the valves 26 and 27 are moved to the position to close the ports 41 and 42, the bracket 49 and head 48 will thereby be raised and through the spring 53 will raise the vacuum supply valve 45 to close the valve seat 44 and shut off power to the pump. The valve 45 may be closed slightly in advance of the final position for the valves 26 and 27 to insure that they may move to completely close the ports 41 and 42 and to insure that the valve 45 will be completely seated, the compression of the spring 53 permitting this action.

When the engine is stopped and the driver leaves the vehicle, the operating rod 57 may be pulled by him toward the left as viewed in the drawing. This will break the circuit to the motor 65 of the radiator and will also exert an upward thrust through the plunger 54 to close the valve 45—44 and stop the vacuum-operated pump motor. If preferred and as described, the stem 46 may by this operation thrust upwardly on the bracket 49 and move the valves 26 and 27 to their upper pump-shutting-off position.

By this means, if it be desired to stop the radiator fan motor to reduce heating of the vehicle interior by moving the rod 57 toward the left to break the electric circuit, the valves 26 and 27 may be left thereby in position to permit water to circulate through the heater and radiator from the cooling system of the engine to insure circulation of water through the heater by the engine pump even in case of failure of the thermostat 18. Also, as may occur in warm weather, if the engine be started up cold at a time when heat is not wanted in the vehicle interior, the operating rod 57 would obviously be in the "off" or toward-the-left position, shutting off power to the pump motor. In such a case, except for provision to keep the valves open, water in the heater would not be circulated except at a slow rate thermally and might over-heat or produce steam before the thermostat 18 could function; but with the valves 26 and 27 held open as above described, circulation by the engine water pump is insured and the generation of steam will be prevented.

In some cases it may be desired to cause the thermostat 18 to respond to temperature of the heater directly and not indirectly as above described by heated water after it has passed through the radiator 67 and some heat extracted therefrom. It is for this purpose that the casing 16 is formed integrally with one of the heater tube walls 81 as above described and illustrated in Fig. 1. By this construction, water in the casing 16 surrounding the thermostat 18 will be quickly brought to the temperature of the water in the heater irrespective of the temperature of the water coming through the casing from the radiator 67; and this will further insure that the temperature of the water in the heater will not rise to the steam-generating temperature.

Having thus described my invention in one embodiment thereof, I am aware that numerous and extensive departures involving the substitution of mechanical equivalents for the forms of apparatus herein described may be employed within the spirit of my invention and as contemplated by the appended claims defining my invention.

I claim:

1. In a heating system, a radiator having a liquid heated core, a source of heat, a liquid heater subjected to heat of the source, circulating conduit means containing liquid and including the radiator core, the heater, and a pump for circulating heater heated liquids through the radiator core, the heater being capable of rapidly heating the circulating liquid to higher than a predetermined temperature, a second source of heat, a second heater subjected to heat of the second source, a second circulating conduit means containing liquid and including the second heater, the second heater being incapable of rapidly heating the liquid of the second system, means controlling temperature of liquid in the second conduit means to maintain it below a predetermined maximum less than said predetermined temperature, operable valve means and conduit means controlled thereby for interconnecting the two conduit means to cause liquid from the two conduit means to mix and effect transfer of heat from one to the other, and a thermostat responsive to temperature of liquid supplied to the radiator core to operate the valve means to cause sufficient mixing of the liquids to maintain the temperature of the radiator substantially at said predetermined temperature.

2. A heating system as described in claim 1 and in which the valve means is variably operated by the thermostat commensurably with changes of temperature of liquid flowing in the radiator core and effects the mixing of variable amounts of the liquid from the second conduit means with that of the first conduit means.

3. In a heating apparatus, a liquid circulating system comprising a liquid heated radiator, a liquid heater including a source of heat therefor, a pump, and circulatory conduit means interconnecting the same whereby the pump may circulate liquid heated in the heater through the radiator, the heater and source of heat being capable of raising the temperature of the liquid to a predetermined value, a second system comprising a second liquid heater and heat source therefor and a second liquid circulating conduit means communicating with the second heater, means to maintain the temperature of liquid in the second conduit means below a predetermined maximum less than said predetermined value, the second heater being incapable of rapidly heating the liquid in the second system, operable valve means and conduit means controlled thereby for effecting interconnection between the two systems to cause liquid heated by both heaters to mix and flow together through the radiator, and thermostatic means to operate the valve means responsive to a predetermined temperature of liquid flowing through the first system to cause the liquids to mix proportionately to substantially maintain the temperature of the radiator at a predetermined value.

4. A heating system as described in claim 3 in which the first system contains a quantity of water sufficiently small to be heated more rapidly than the water in the second system.

5. A heating system as described in claim 3 in which a pump is provided to circulate the liquid in the second system.

6. In a heating apparatus, a liquid circulating system comprising a liquid heated radiator, a liquid heater including a source of heat therefor, a pump, and circulatory conduit means interconnecting the same whereby the pump may circulate liquid heated in the heater through the radiator, the heater being capable of rapidly raising the temperature of the circulated liquid above a desired heater temperature, a second system comprising a liquid heater and heat source therefor and a second liquid circulating conduit means communicating with the second heater, means for maintaining the temperature of liquid in the second conduit means below the desired first heater temperature, thermostatically operated valve means and conduit means controlled thereby, the valve means being responsive to temperature of liquid flowing through the first system below the desired heater temperature and controlling the conduit means to maintain the first system substantially isolated from the second system, and responsive to temperature at or above the desired heater temperature and controlling the conduit means to interconnect the two systems to cause a sufficient proportion of liquid from the second system to mix with liquid in the first system and flow together through the radiator to maintain it at substantially the desired temperature, and the valve means being responsive to temperature above a predetermined value of the first system to cause liquid from the radiator to flow successively through the heaters.

7. In a heating apparatus, a liquid circulating system comprising a liquid heated radiator, a liquid heater including a source of heat therefor, a pump, and circulatory conduit means interconnecting the same whereby the pump may circulate liquid heated in the heater through the radiator, a second system comprising a liquid heater and heat source therefor and a second liquid circulating conduit means communicating with the second heater, the first heater being capable of rapidly raising the temperature of the circulating liquid above a desired heater temperature, means for maintaining the temperature of liquid in the second system below the desired heater temperature, the second system being incapable of rapidly heating the liquid of the second system, operable valve means and conduit means controlled thereby for effecting interconnection between the two systems to cause liquid heated by both heaters to mix and flow together through the radiator, thermostatic means to operate the valve means responsive to changes of temperature of liquid flowing through the first system to cause sufficient mixing to maintain the temperature of liquid in the radiator substantially below a predetermined maximum value, an electric motor driven blower for blowing air to be heated through the radiator and an operable switch to energize and de-energize the motor, and means to cause the valve means to be operated independently of temperature to interconnect the two systems upon operation of the switch to de-energize the blower motor.

8. In an apparatus for heating an automotive vehicle of the type comprising an engine having a cooling system through which liquid is circulated by an engine driven pump and means are provided to maintain liquid in the cooling system below a predetermined maximum temperature, a liquid heated radiator, a second system comprising a liquid heater deriving heat from the exhaust gases of the engine, a pump, and circulating conduit means interconnecting the same whereby the pump may circulate liquid heated in the heater through the radiator, the quantity of liquid in the circulating conduit means being sufficiently small to be heated more rapidly than the liquid in the cooling system and the exhaust heated liquid heater being capable of heating it to a higher temperature than the liquid in the cooling system, conduit means communicating with the cooling system of the engine, operable valve means and conduit means controlled thereby for effecting intercommunication between the second system and the conduit means of the cooling system to cause liquid from both systems to flow concurrently through the radiator, and thermostatic means to operate the valve means responsive to the temperature of liquid flowing through the second system to cause the proportion of liquid of both systems to be such as to maintain the temperature of the radiator substantially at a predetermined temperature.

9. In a heating apparatus for heating the interior of automotive vehicles of the type comprising an engine having a pump-operated liquid cooling circulatory system, and means to maintain the liquid in the cooling system below a predetermined maximum temperature, a heating system comprising a liquid-heated radiator, a liquid heater deriving heat from the engine exhaust, circulatory conduit means interconnecting the same whereby liquid heated in the heater may circulate through the radiator, the quantity of liquid in the circulatory conduit means being sufficiently small to be heated more rapidly than the liquid in the cooling system, and the liquid heater being capable of rapidly heating it to a temperature higher than the cooling system liquid, conduit means effecting communication between the cooling system and the said heating system, valve means and conduit means controlled thereby, the valve means being operable variably to cause variable amounts of liquid heated by the heater to flow through the radiator concurrently with liquid of the cooling system, thermostatic means to variably operate the valve means commensurably responsive to changes of temperature of liquid flowing through the heating system to effect a proportioning of the liquids to maintain the radiator at a predetermined temperature.

10. In a heating apparatus for heating the interior of automotive vehicles of the type comprising a liquid circulating pump-driven cooling system for the engine, and means to maintain the liquid in the cooling system below a predetermined maximum temperature, a heating system comprising a liquid heated radiator, a liquid heater deriving heat from waste gases of the engine, circulatory conduit means interconnecting the same whereby the pump may circulate liquid heated in the heater through the radiator, the quantity of liquid in the circulatory conduit means being sufficiently small to be heated more rapidly than the liquid in the cooling system, and a liquid heater being capable of rapidly heating it to a temperature higher than that of the cooling system liquid, conduit means interconnecting the cooling system and the heating system, thermostatic valve means and conduit means controlled thereby, the valve means being operable responsive to temperature of liquid flowing through the heating system below a desired heater temperature to maintain the heating system substantially isolated from the cooling system and responsive to temperature above said desired heater temperature to interconnect the two systems to cause a sufficient proportioning of liquids from the cooling system to mix with the liquid of the heating system to flow together through the radiator to maintain substantially a predetermined heater temperature, and responsive to temperature above the desired heater value to cause liquid to flow from the radiator successively through the two heaters.

11. In a heating system for automotive vehicles of the type comprising an engine having a liquid cooling system and a circulating pump therefor, a heating system comprising a radiator in the vehicle having a liquid passageway therethrough and air heating passageways, an electrically operable blower for blowing air through the radiator, a liquid heater associated with the exhaust pipe of the engine deriving heat therefrom to heat liquid in the heater, a pump operable by engine vacuum, a vacuum conduit communicating with the pump and the engine, and interconnecting conduit means whereby the pump may circulate liquid through the heater and through the radiator passageway, the quantity of liquid circulated through the heater being sufficiently small to be heated more rapidly than that in the cooling system of the engine, a thermostat disposed in the line of flow of the heated liquid, conduit means connecting the circulating system of the engine with the said heating system, valve means controlling the interconnection operated by the thermostat, the valve means being arranged to operate upon a rise of temperature to commensurably divert liquid from the engine cooling system into and through and out of the said heating system, a switch operable to energize and de-energize the blower motor, a connection between the switch and the valve means to operate it to liquid diverting position upon movement of the switch to de-energize the motor.

12. In a heating system for automotive vehicles of the type comprising an engine having a liquid cooling system and a circulating pump therefor, a heating system comprising a radiator in the vehicle having a liquid passageway therethrough and air heating passageways, an electrically operable blower for blowing air through the radiator, a liquid heater associated with the exhaust pipe of the engine deriving heat therefrom to heat liquid in the heater, a pump operable by engine vacuum, a vacuum conduit communicating with the pump and the engine, and interconnecting conduit means whereby the pump may circulate liquid through the heater and through the radiator passageway, the quantity of liquid circulated through the heater being sufficiently small to be heated more rapidly than the liquid in the cooling system, a thermostat disposed in the line of flow of the heated liquid, conduit means connecting the circulating system of the engine with the said heating system, valve means controlling the interconnection operated by the thermostat, the valve means being arranged to operate, upon a rise of temperature, to commensurably divert liquid from the engine cooling system into and through and out of the said heating system, a switch operable to energize and de-energize the blower motor, a connection between the switch and the valve means to operate it to liquid diverting position upon movement of the switch to de-energize the motor, and a valve controlling the vacuum conduit connection to the motor connected with and operable by the switch upon operation thereof.

13. In a heating system, a radiator having a liquid heated core, a source of heat, a liquid heater subjected to heat of the source, a circulating conduit system including the radiator and the heater and containing liquid, and the heater being capable of rapidly heating the liquid to a predetermined excessively high temperature, means for preventing the temperature of the liquid from rising substantially above a predetermined value comprising a second circulatory conduit system containing a second quantity of liquid, and a second heater therefor capable of raising its temperature relatively slowly, heat transfer means for substracting heat therefrom to maintain it below a predetermined maximum temperature less than the said excessively high temperature, operable valve means and conduit means controlled thereby adapted to variably divert liquid of the second system into heat-extracting relation with the liquid of the first system upon variable operation of the valve means, and thermostatic means responsive to variations of temperature of liquid circulating in the first system to variably operate the valve means to effect sufficient diversion of liquid to prevent the temperature of the radiator substantially from exceeding said predetermined value.

14. A system as described in claim 13 in which upon attainment of temperature of liquid circulating in the first system above a predetermined maximum, the thermostatic means responds to operate the valve means to cause liquid from the radiator core to successively flow through the two heaters.

15. In a heating system, a radiator having a liquid heated core, a source of heat, a liquid heater subjected to heat of the source, a circulating conduit system including the radiator and the heater and containing liquid, and the heater being capable of rapidly heating the liquid to a predetermined excessively high temperature, means for preventing the temperature of the liquid from rising substantially above a predetermined value comprising a second circulatory conduit system containing a second quantity of liquid and a second heater therefor capable of raising the temperature thereof relatively slowly and heat transfer means for subtracting heat therefrom to maintain it below a predetermined maximum less than the said excessively high temperature, and means to effect transfer of heat from the liquid of the first system to the liquid of the second system, operable automatically responsive to temperature changes of liquid supplied to the heater to maintain the temperature of the liquid heated radiator substantially from exceeding said predetermined value.

16. In a heating system, a radiator having a liquid heated core, a source of heat, a liquid heater subjected to heat of the source, circulating conduit means containing a relatively small quantity of liquid and including the radiator core and the heater, the heater being capable of rapidly heating the relatively small quantity of liquid circulating through the radiator core to higher than a predetermined temperature, a second source of heat, a second heater subjected to heat of the source, a second circulating conduit means containing a relatively large quantity of liquid and including the second heater, the second heater being incapable of rapidly heating the larger quantity of liquid of the second system, means controlling temperature of liquid in the second conduit means to maintain it below a predetermined maximum temperature less than the said predetermined temperature, operable valve means and conduit means controlled thereby for interconnecting the two conduit means to cause liquid from the two conduit means to mix with each other and effect transfer of heat from one to the other, and a thermostat responsive to temperature changes of liquid supplied to the radiator core to operate the valve means to cause sufficient mixing of the liquid to maintain the temperature of the radiator substantially at said predetermined temperature.

17. In a heating apparatus, a liquid circulating system comprising a liquid heated radiator, a liquid heater including a source of heat therefor, a pump and circulatory conduit means interconnecting the same whereby the pump may circulate through the radiator liquid heated in the heater, the heater being capable of rapidly raising the temperature of the circulating liquid above a desired heater temperature, a second system comprising a liquid heater and heat source therefor, and a second liquid circulating conduit means communicating with the second heater, means for maintaining the temperature of liquid in the second conduit means below the desired heater temperature, thermostatically operated valve means and conduit means controlled thereby, the valve means being responsive to temperature of liquid flowing through the radiator below the desired heater temperature and controlling the conduit means to maintain the first system substantially isolated from the second system and responsive to temperature at or above the desired heater temperature, and controlling the conduit means to interconnect the two systems to cause a sufficient proportion of liquid from the second system to mix with liquid in the first system and flow together through the radiator to maintain it at substantially the desired temperature.

EDWARD L. MAYO.